July 16, 1929.　　　T. MONDAY　　　1,720,915

CLUTCH PEDAL LOCKING DEVICE

Filed April 18, 1928

INVENTOR
Tobe Monday,
BY
H. W. Plaisted,
ATTORNEY.

Patented July 16, 1929.

1,720,915

UNITED STATES PATENT OFFICE.

TOBE MONDAY, OF ST. LOUIS, MISSOURI.

CLUTCH-PEDAL-LOCKING DEVICE.

Application filed April 18, 1928. Serial No. 270,972.

This invention relates to certain new and useful improvements in clutch pedal locking devices for automobiles, the peculiarities of which will be hereinafter fully described and claimed.

The main object of my invention is to prevent the driver of an automobile from starting the car with the emergency or hand brake lever set in position for "brakes on" and then running it with the brakes on, thereby causing unnecessary strain on the motor, wearing out the brake bands, and wasting gas; secondly, to lock positively the clutch pedal when the hand brake lever is operated first; and thirdly, to prevent locking the hand brake lever by my device when the clutch pedal is operated first.

Figure 1:
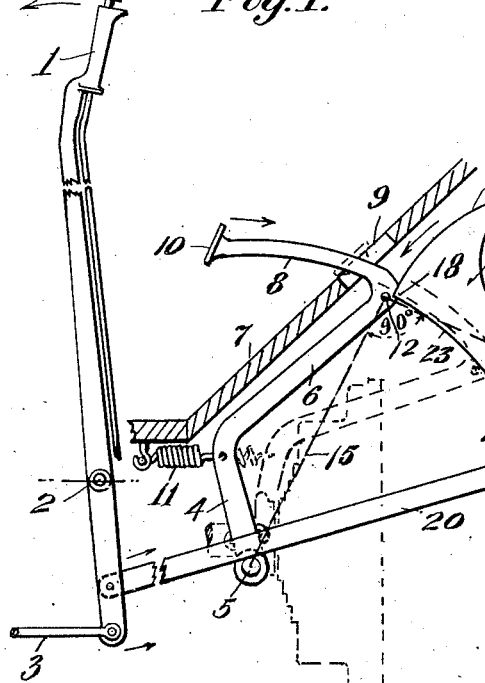
Figure 3:
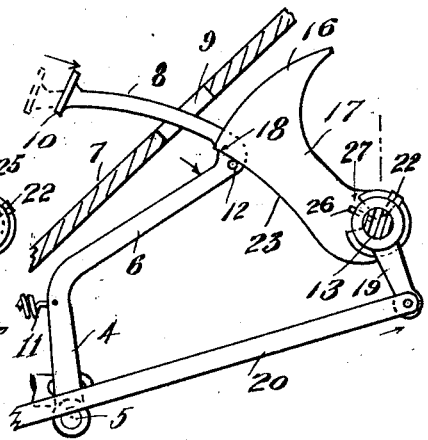
Figures 2, 4:
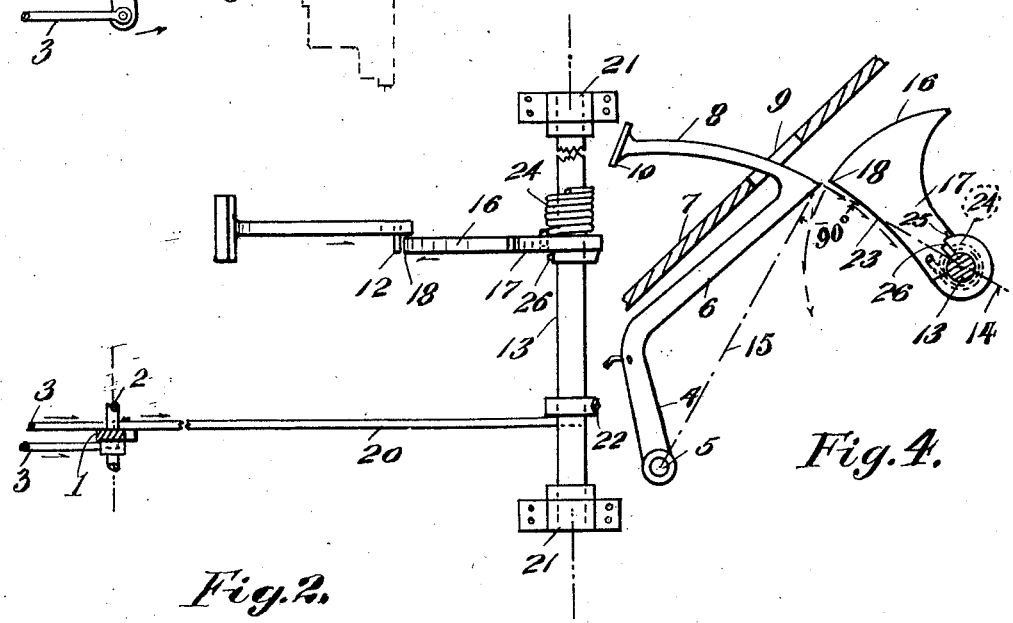

In the accompanying drawing on which like reference numerals indicate corresponding parts, Fig. 1 represents a side view of an emergency or hand brake lever and a clutch pedal with my improvements applied thereto;

Fig. 2, a plan view of the same;

Fig. 3, a side view showing the operation of my device when the clutch pedal is operated before the hand brake lever; and Fig. 4, showing a sharp elbow on the clutch pedal and my cam cooperating with it.

In a prior application Ser. No. 263,424, filed Mar. 21, 1928, I have shown means for locking the gear shift lever by previously throwing the emergency lever. In the present application I illustrate means to prevent operation of the clutch pedal when the emergency brake lever is first operated. Other differing features of construction and operation will appear later.

Referring to the drawing, the numeral 1 designates a suitable form of emergency or hand brake lever pivotally fulcrumed at 2 and having at the lower end rod connections 3—3 to the rear wheel brakes (not shown). Similar rod connections will connect the lever to the front wheel brakes when four-wheel brakes are used. For the sake of clearness, the usual foot pedals other than the clutch pedal are not shown.

The clutch pedal 4 is pivoted at 5 to the clutch—indicated by dotted lines in Fig. 1,—and is bent to form a straight portion 6 adapted to fit under the foot-board 7 having its upper end beyond the elbow curved in an arc 8 about its pivot as a center, so as to operate in an opening 9 of said footboard as usual by the foot of the driver pressing downward on the end plate 10 against the tension of the retracting spring 11. This elbow is usually quite rounded and to adapt it to my device I provide a pin 12, laterally or otherwise inserted in the elbow. Then I locate a horizontal shaft 13 in a line 14 at right angles to a line 15 connecting said pivot 5 with said pin 12, (or other comparatively sharp corner on the clutch pedal as shown in Fig. 4,) so that the pin or sharp corner will bear on a curved head 16 of a cam 17 mounted on said shaft when rotated under the pin or corner.

This curved head is formed by an arc of a circle having its center coincident (or substantially so) with that of said shaft, so that when the cam and shaft are rotated (as will presently be described) the cam head will pass downward under the said pin as indicated by an arrow, and the pin will bear perpendicularly on the cam head if the driver tries to depress the clutch pedal. In other words, this pin—or its equivalent—is stopped by said cam head whenever the lower corner 18 of the cam turns past the pin in the raised position of the lever as illustrated in Fig. 1.

This rotary turning movement of the cam is effected by operative connections to the hand brake lever and said connections preferably consist of a crank arm 19 depending from said shaft, having its lower end pivoted to one end of a push rod 20 the other end of which rod is also pivoted to said hand brake lever below its fulcrum pivot 2. The shaft is suitably mounted in bearings 21 supported on adjacent parts of the frame or otherwise, so as to locate the shaft as above described. A set screw 22 or other means fastens the head of said crank arm to the shaft so that the pin at the elbow of the clutch pedal normally clears said lower corner 18 of the cam head as it is carried downward.

A lower edge 23 of the cam is formed by an arc struck from substantially the center of the pivot 5 of the clutch pedal. The pin is carried downward closely adjacent to this edge 23 when the clutch pedal is depressed as indicated by dash lines Fig. 1. But when the clutch pedal is in its normal raised position—as shown by full lines Fig. 1,—any backward movement of the hand brake lever from its normal position in order to set the brakes, will operate said push rod and crank arm forward—as per arrows,—and turn the cam head downward under the pin and thus lock the clutch pedal in its raised position. Even a slight movement of the hand brake lever in setting the brakes slightly, will lock the clutch pedal in its raised position.

The clutch pedal can not be depressed from its normal position when the hand brake lever is first operated and thereby locks the former; the car can not be moved from a stop, nor run with the brakes ever so slightly set before trying to depress the clutch pedal. Therefore, the brakes must first be released in order to throw in the clutch on starting; also, when the car is running, with the clutch pedal raised as usual, the brakes may be set to check the speed of the car, and thereupon will lock the clutch pedal in raised position till the brakes are thrown off again.

As previously stated above, with the brakes off, the cam does not control the clutch pedal, which can be depressed freely; yet when depressed even slightly, its pin (or sharp point) passes below the said corner 18 of the cam and downward adjacent to the said lower edge 23 of the cam. (Fig. 3.)

If the hand brake lever were rigidly connected to the cam, the side edge of the cam engaging the depressed pin (or sharp elbow) would then prevent setting the brakes. I therefore provide a flexible connection for one of the members of the operative connections between the hand brake lever and the cam,—preferably the cam,—by means of a coil spring 24 (or similar means,) having one end fixed to the shaft and the other to the cam, and tensioned normally to keep a shoulder 25 of the cam hub pressed against a stub 26 projecting from the shaft.

This spring connection causes the cam to turn downward with the shaft, except when the lower side edge of the cam engages the elbow pin (or sharp corner) as in Fig. 3; but if when so engaged, the brakes require to be set, the hand brake lever will still operate to set the brakes and also turn the shaft but not the cam, as indicated by an open space 27 between the cam hub shoulder and stub in the shaft (Fig. 3). Immediately on releasing the clutch pedal however the cam will turn downward under the tension of said spring 24, and lock the clutch pedal in raised position till the brakes are released. This spring connection might be applied to the crank arm or otherwise, instead of to the cam.

Thus it is evident that my device does not prevent setting the brakes at any time; also, that it locks the clutch pedal in raised position whenever the brakes are set slightly, or as much as may be required.

I claim:

1. An automobile comprising a hand brake lever, a clutch pedal, a rotary shaft mounted adjacent to said pedal, a crank arm on said shaft, a rod connection between said crank arm and hand brake lever, and means carried by said shaft adapted to engage and lock said pedal in raised position by prior operation of said lever.

2. An automobile comprising a hand brake lever, a clutch pedal having an elbow, a rotary shaft mounted in a line at right angles to a line from said elbow to its pivot, a cam mounted on said shaft and having a head adapted to engage and lock said pedal in raised position, and operative connections between said shaft and lever.

3. An automobile comprising a clutch pedal, a rotary pivoted cam mounted adjacent thereto having two bearing surfaces,—one formed by an arc struck from the center of the cam pivot and the other formed by an arc struck from substantially the center of the pedal pivot,—and operative means for said shaft.

4. An automobile comprising a hand brake lever, a clutch pedal, operative connections between them adapted to lock the latter by prior operation of the former, and a flexible member interposed in said connections preventing obstructing the operation of the hand brake lever when the clutch pedal is first operated.

5. An automobile comprising a hand brake lever, a clutch pedal having an elbow and a pin mounted in said elbow, a rotary cam having a head and lower edge adapted for bearing surfaces for said pin,—said pin adapted to engage the head and lock the pedal in raised position and to engage said lower edge and prevent rotation of the cam,—operative connections between said cam and hand brake lever, and a flexible member in said connections, substantially as and for the purpose described.

6. An automobile comprising a hand brake lever, a clutch pedal, a rotary shaft, cam and crank members mounted thereon, operative connections between said crank and hand brake lever,—one of said members being loosely mounted on the shaft and having a shoulder adapted to engage a stub on the shaft,—and a spring normally acting to maintain engagement of stub and shoulder and forming a flexible connection, substantially as and for the purpose described.

In testimony whereof I have affixed my signature.

TOBE MONDAY.